Patented Oct. 22, 1935

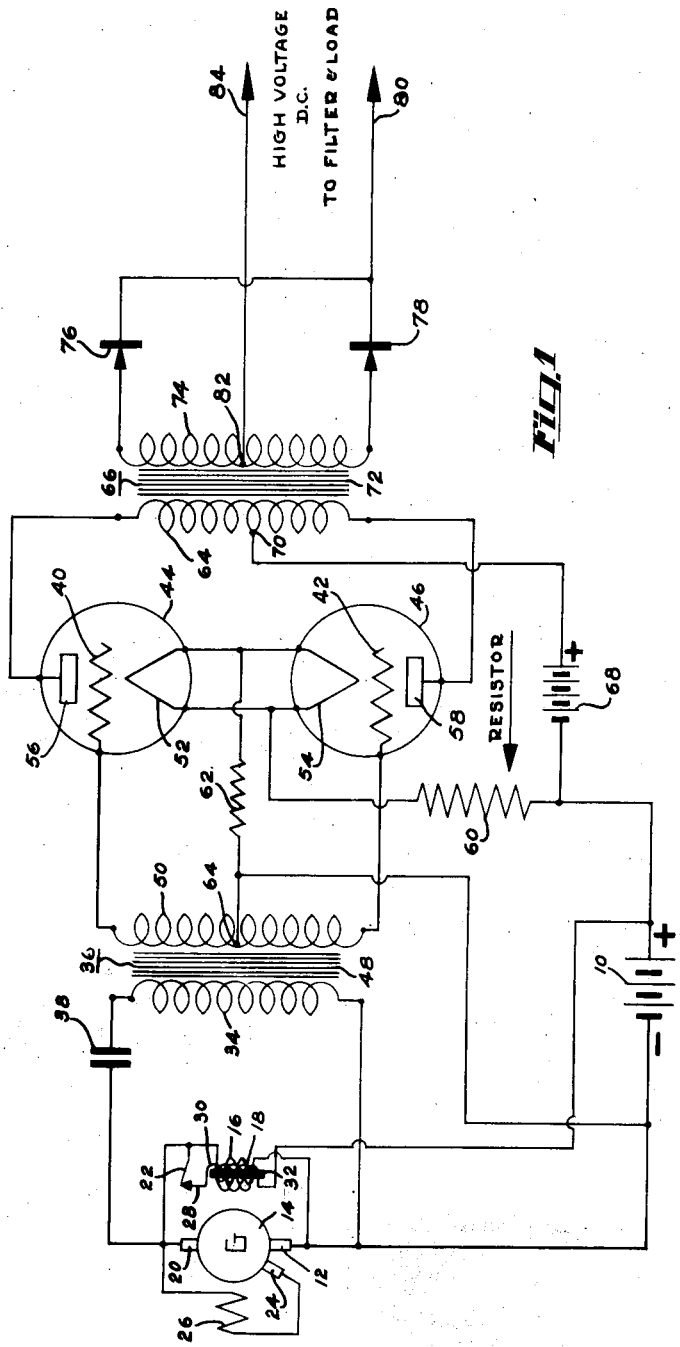

2,018,483

UNITED STATES PATENT OFFICE

2,018,483

POWER SUPPLY

Francis T. Brewer, Dayton, Ohio, assignor to General Motors Corporation, Detroit, Mich., a corporation of Delaware Application January 28, 1933, Serial No. 654,095

15 Claims. (Cl. 171—97)

This invention relates to a power supply, and more particularly to a circuit for obtaining a predetermined alternating or direct current voltage from a direct current source.

An object of this invention is to provide a circuit and means for converting current from a direct current source to an alternating or pulsating current so that a predetermined voltage may be obtained therefrom.

Another object of this invention is to provide a circuit particularly adaptable to obtaining a high voltage direct or alternating current from a low voltage direct current source.

Another object of this invention is to provide a circuit particularly adaptable to obtaining the necessary high direct current potentials for the operation of a radio receiver on an automobile without the necessity of expensive batteries therefore, and that does not necessitate the purchase of expensive and inefficient mechanically operated parts.

Another object of this invention is to provide means of converting direct current to an alternating or pulsating current of relatively high frequency.

Further objects and advantages of the present invention will be apparent from the following description, reference being had to the accompanying drawing wherein a preferred embodiment of one form of the present invention is clearly shown.

In the drawing:

The single figure discloses a schematic diagram of a circuit embodying a preferred form of the present invention.

With particular reference to the drawing, a battery 10 is connected to a suitable source of charging current, as for instance that ordinarily used on automobiles, one form of which has been shown. One side of the battery 10 is connected to a main brush 12 of a generator 14. The winding 16 of a relay 18 has one end connected to the main brush 12 and its other end connected to a main brush 20 of the generator 14 and the contact arm 22 of the relay 18. The generator 14 has a field winding 26 having one end connected to the main brush 20 and the other end connected to a third brush 24. When the output of the generator becomes sufficient to energize winding 16 of the relay 18 by a predetermined amount, the contact arm 22 is actuated to effect engagement of that contact arm with a contact 28 to thereby close a circuit from the main brush 20 through a winding 30 of the relay 18 to the other side of the battery 10. Both windings of the relay 18 are wound on a magnetic core 32.

Since the one side of the battery is permanently connected to the main brush 12 the charging circuit is completed from the main brush 20 to the other side of the battery by engagement of the contact arm 22 and the contact 28.

The effect of commutation in a direct current generator is to produce a ripple voltage or a pulsating component superimposed upon the direct current component of the generator output. This ripple voltage or pulsating component of the generator output is utilized in the present circuit to apply an alternating potential to control electrodes 40 and 42 of thermionic control tubes 44 and 46 respectively. This is accomplished by connecting a primary winding 34 of a transformer 36 across the main brushes 12 and 20 of the generator 14 through a condenser 38. The condenser 38 is connected in series with the lead between one end of the primary winding 34 and the brush 20 to prevent the direct current from flowing through the primary winding 34. This is desirable to reduce the load on the generator 14, as well as the saturation of a core 48 of the transformer 36. The transformer 36 is preferably a step-up transformer and has a secondary winding 50, the ends of which are connected to the control electrodes 40 and 42.

Beside the control electrodes 40 and 42, the thermionic control tubes 44 and 46 have filament or cathode elements 52 and 54 and anodes 56 and 58 respectively, therein. The filament or cathode elements 52 and 54 are connected in parallel. One side of the battery 10 is connected to one side of the parallel combination of the cathodes through a resistor 60. The other side of the battery 10 is connected to the other side of the parallel combination of the cathodes through a resistor 62, and to a mid-tap 64 on the secondary winding 50. The side of the battery that is connected to the mid-tap 64 of the secondary winding 50 is preferably the negative side, so as to provide a negative potential for the control electrodes 40 and 42, and by virtue of the potential drops across the resistors 60 and 62, provide a biasing potential for those control electrodes. The potential drop in the resistors 60 and 62 also reduces the battery voltage to a value suitable for heating the cathode or filament elements 52 and 54.

The anodes 56 and 58 are connected to the ends of a primary winding 64 of a transformer 66. The battery 68, which may or may not be necessary, depending upon the voltage of the battery 10, has one side connected to a side of the battery 10 so that the two batteries are in series. The other side of the battery 68 is connected to a mid-tap 70 of the primary winding 64, so as to provide a positive potential for the anodes 56 and 58. If the battery 68 is unnecessary, and the potential of the battery 10 is sufficient, the positive side of the battery 10 will be connected directly to the mid-tap 70. The transformer 66 has a core 72 and a secondary winding 74. One side of the secondary winding 74, as shown, is connected to one side of a rectifier unit 76, and the other extremity of the secondary winding 74 is connected to one side of a similar rectifier unit 78. The other sides of the rectifier units 76 and 78 are connected together and to a suitable lead 80 provided for making connection to a desired filter or load. A mid-tap 82 on the secondary winding 74 is connected to a suitable lead 84 to provide the other connection to the desired filter or load.

In the operation of the circuit, the filament or cathode elements 52 and 54 are heated by current from the battery 10 so as to emit electrons. The ripple or pulsating potential from the generator is preferably stepped up by the transformer 36 and is thereby transformed into an alternating current and applied to the control electrodes 40 and 42 so that it controls the flow of electrons from the cathode elements 52 and 54 to the anodes 56 and 58 respectively. Since the control electrodes 40 and 42 are connected to opposite ends of the secondary winding 50, the potentials applied thereto are substantially 180 degrees out of phase, and the time of maximum current flow through the thermionic control tubes 44 and 46 will alternate between the two. Since the anode currents pass through the primary winding 64 of the transformer 66, a pulsating flow of current is effected in the halves of that winding so that the pulsations and directions of flow alternate between the halves of the winding. Hence, an alternating potential is produced in the secondary winding 74, the voltage of which may be controlled by the turn ratio of the transformer 66. When a direct current output is desired, a rectifier circuit, such as that shown and described or any other suitable rectifier circuit is connected to the secondary winding 74.

The frequency of the ripple or pulsating potential from the generator is controlled by the number of commutator segments as well as the speed of the generator. Hence, with the ordinary type of generator, under normal operating conditions, the frequency is quite high. A high frequency is desirable since it reduces the necessary size of the cores used in the transformers.

It is understood that the same system might be utilized with other types of charging circuits and for different applications, without departing from the spirit of the present invention.

While the form of embodiment of the present invention as herein disclosed, constitutes a preferred form, it is to be understood that other forms might be adopted, all coming within the scope of the claims which follow.

What is claimed is as follows:

1. A system for obtaining a pulsating current from a battery and charging means for said battery, which charging means provides a pulsating component voltage, comprising in combination, thermionic current interrupting means for interrupting the current flow from said battery to produce a pulsating flow therefrom; and means for controlling said interrupting means by said battery charging means.

2. A system for obtaining a pulsating current from a battery and charging means for said battery, which charging means provides a pulsating component voltage, comprising in combination, a thermionic current interrupting tube for interrupting the current flow from the battery to effect a pulsating flow therefrom, said tube having a control electrode therein; and means for controlling the potential of the control electrode from the battery charging means.

3. A system for obtaining a pulsating current from a battery and charging means for the battery, which charging means provides a pulsating component voltage, comprising in combination, means for effecting an intermittent current flow from the battery; and means for controlling the frequency of the intermittent current flow by the battery charging means.

4. A system for obtaining a pulsating current from a battery and charging means for the battery, which charging means has a pulsating output voltage component, comprising in combination, a thermionic control tube for effecting an interrupted current flow from the battery, said control tube having a control electrode therein; and means for controlling the potential of the control electrode from the pulsating voltage produced by the charging means.

5. A system for obtaining a pulsating current from a battery and charging means for the battery, which charging means has a pulsating output voltage component, comprising in combination, thermionic control tubes for effecting a pulsating current flow from the battery, said control tubes having control electrodes therein; and means for coupling the control electrodes to the charging means to apply a potential to the control electrodes that is proportional to the pulsating voltage of the charging means.

6. A system for obtaining a pulsating current from a battery and charging means for the battery, which charging means provides a pulsating component voltage, comprising in combination, thermionic control tubes for effecting a pulsating current flow from the battery, said control tubes having control electrodes therein; means for coupling the control electrodes to the charging means to apply a controlling potential to the control electrodes that is proportional to the pulsating voltage of the charging means; and means for preventing the direct current component of the voltage from the charging means from being applied to the control electrodes together with the pulsating voltage.

7. A system for obtaining a pulsating current from a battery and charging means for the battery, which charging means provides a pulsating component voltage, comprising in combination, thermionic control tubes for effecting a pulsating current flow from the battery, said control tubes each having a control electrode therein; means for coupling the control electrodes to the charging means to apply a controlling potential to the control electrode; and means for applying a constant potential bias voltage to the control electrodes.

8. A system for obtaining a pulsating current from a direct current source including a generator, comprising in combination, a transformer, and means including a thermionic tube controlled by the pulsating component of voltage from said generator for effecting a pulsating current flow from the source to the transformer.

9. A system for obtaining a pulsating current from a battery and charging means for the battery, which charging means provides a pulsating voltage component, comprising in combination, thermionic control tubes each having an electron emitting element, a control electrode and an anode therein; means including a transformer for applying an alternating potential to the control electrodes from the charging means; said electron emitting element being heated by current from the battery so as to emit electrons; said control electrodes effecting control of the flow of the said electrons between the electron emitting elements and the anodes; and means coupling said anodes and thereby having a pulsating current set up therein.

10. A system for obtaining a pulsating current from a battery and charging means for the battery, which charging means has a pulsating output voltage component, comprising in combination, thermionic control tubes each having a control electrode, a cathode element and an anode therein; a transformer for applying an alternating potential to the control electrodes from the charging means; a second transformer having a winding connected to the anodes; means for heating the cathode elements to cause said elements to emit electrons; said control electrodes effecting control of the electron flow in response to the alternating potential applied thereto, and thus effecting a pulsating current flow in said winding of the second transformer.

11. A system for obtaining an alternating current from a battery and a source of pulsating current, comprising in combination, thermionic control tubes each having a control electrode, a cathode element and an anode therein; a first transformer having one of its windings connected to the control electrodes so that the potentials applied to the control electrodes thereby are substantially 180° out of phase, another winding of said first transformer being connected to a source of pulsating current; means for heating the cathodes from the battery; means for applying a potential to the anodes; and a second transformer having a winding connected to the anode and having a tap thereon for providing a return circuit to the cathodes.

12. A system for obtaining a high voltage direct current from a low voltage direct current source, comprising, in combination, a transformer having primary and secondary windings; means for varying the magnitude of the current flow from said low voltage source to effect a rapidly changing current flow in the primary winding of said transformer; means independent of the current interrupting means for controlling the frequency of the current variations; and means for rectifying the voltage produced in the secondary winding of the transformer.

13. A system for obtaining a high voltage direct current from a plurality of low voltage direct current sources, one of which sources is a battery, and the other of which has a ripple output voltage component, comprising, in combination, a transformer having primary and secondary windings, means controlled by said ripple voltage for effecting a rapidly varying flow of current from said battery to said primary winding, and means for rectifying the voltage produced in said secondary winding by the current variations in the primary winding.

14. A system for obtaining an alternating potential of a certain value from a direct current source having a different potential value, comprising, in combination, a transformer having a primary winding; a direct current source; thermionic current controlling means for controlling the current flow from said direct current source thru the primary winding to produce a rapidly varying current flow in the primary winding; and means for controlling the thermionic current controlling means to effect said current control and establish the frequency of the current variations.

15. A system for obtaining an alternating potential of predetermined value from a direct current source having a different potential value, comprising, in combination, a transformer having a primary winding; a source of direct current and a circuit therefor; thermionic current controlling means for controlling current flow from said source thru the primary winding to produce a rapidly varying current flow in the primary winding, said thermionic current controlling means having a control electrode for controlling the current flow therethru; and means for applying a rapidly varying potential to said control electrode from the circuit of said source to effect the control of the current flow thru the thermionic means.

FRANCIS T. BREWER.